No. 887,088. PATENTED MAY 12, 1908.
H. G. GEISSINGER.
SYSTEM OF TEMPERATURE CONTROL.
APPLICATION FILED JULY 3, 1907.
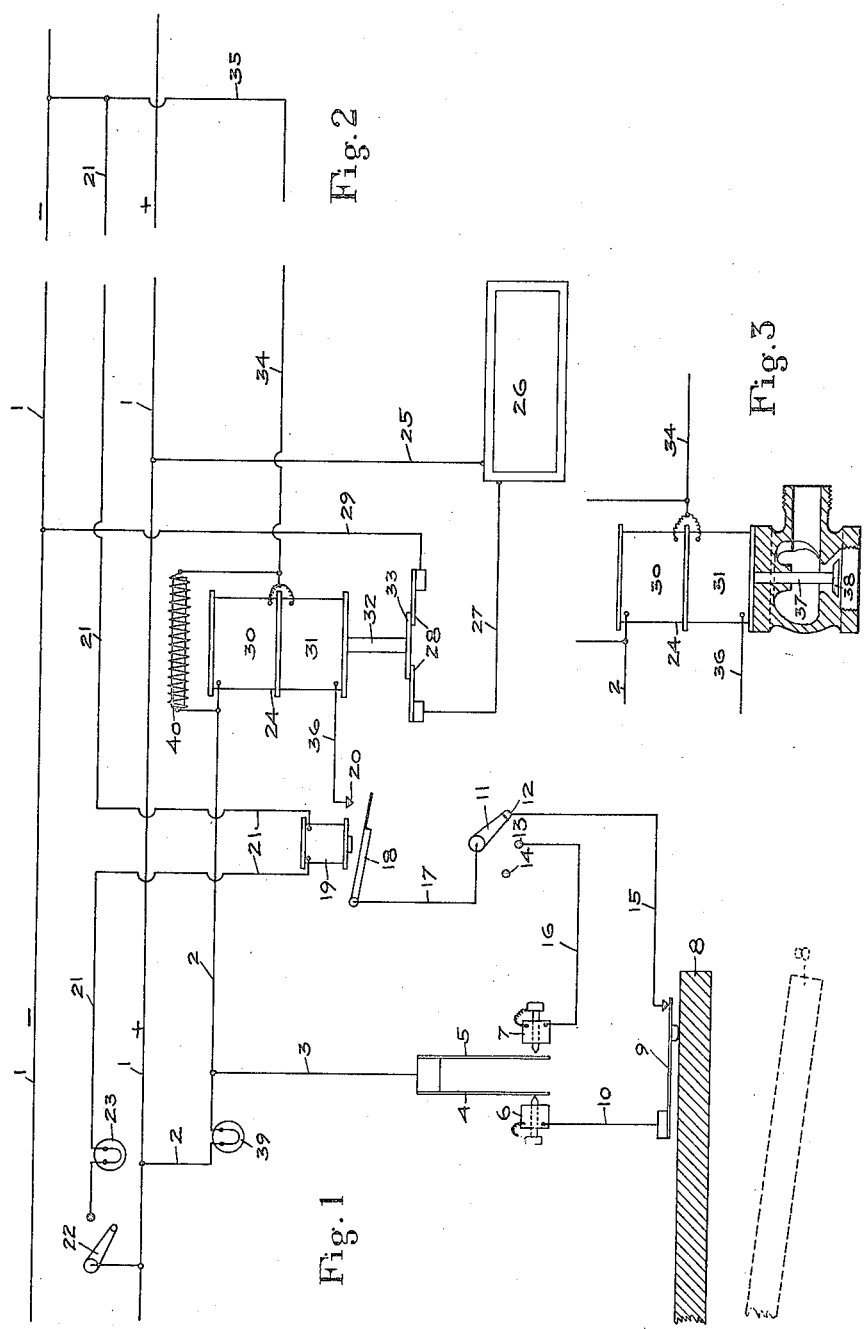
Witnesses:
J. R. Wemlinger
H. T. Wemlinger
Inventor:
H. G. Geissinger

UNITED STATES PATENT OFFICE.

HARRY G. GEISSINGER, OF NEW YORK, N. Y.

SYSTEM OF TEMPERATURE CONTROL.

No. 887,088.　　　　　Specification of Letters Patent.　　　　Patented May 12, 1908.

Application filed July 3, 1907. Serial No. 382,100.

*To all whom it may concern:*

Be it known that I, HARRY G. GEISSINGER, a citizen of the United States, residing at New York city, in the county of New York and State of New York, have invented certain new and useful Improvements in Systems of Temperature Control, of which the following is a specification.

My invention relates to means for regulating the temperature in a room or a series of rooms or apartments through the agency of electric heat controlling devices, and its object is to provide a system of control which permits the regulation in each room or apartment to be made independently of that in the other rooms, although all the rooms may be in series and operated from the same circuit.

My improved system consists in the installation in each room or apartment of one or more electric thermostats, and, if more than one thermostat is employed, the same are adjusted to different working temperatures and arranged to work independently of each other. In my drawing I show two such thermostats, presumedly set at suitable day and night temperatures. I have also shown my system diagrammatically, for the sake of clearness of illustration, inasmuch as the devices employed are well known in the art to which this invention appertains.

Figure 1 is a diagrammatic view of the arrangement of the wiring and apparatus in each room of a series all operated from the same current mains and heated by electric heaters. Fig. 2 is a diagram of the terminal connections in the last room of the series, beyond the apparatus for that room, and illustrates how the operating current completes the circuit with the return main. Fig. 3 is a longitudinal section of a valve and an elevation of the operating mechanism used in connection with my system when the same is to be applied to steam or hot water heat regulation.

Figs. 1 and 2 show my improved system of heat regulation applied to the control of electric heaters in state-rooms on board ship, and the installation, in this instance, includes certain features peculiar to the special needs of the case, as, for example, means for cutting off the high temperature thermostat automatically when the state-room door is left open.

Fig. 1 further shows means whereby the use of the heater in each room may be cut off entirely from a central point like the engine room. It shows also that, while each room of the series may be regulated independently, all the rooms of the series, preferably ten, use the same regulating circuit.

Temperature control systems employed heretofore, whether they use compressed air or electricity, have presumed that the occupant of the room so regulated would adjust the controlling device to suit his individual tastes, day and night. Inasmuch as the majority of such installations are, and have been, made in hotels and other buildings occupied transiently, they are subject to persistent manipulation of the temperature regulating device, and this must, necessarily, result in damage to the instrument and unexpected derangements of the heat supply. Therefore, while my system contemplates the installation of adjustable thermostats in each room or apartment, I prefer to have this adjustment under certain restrictions, as, for instance, a key kept in the engine room, or some other official control. I also prefer to have two or more thermostats each set at a different temperature. Two thermostats will fill practically every want of the occupant of the room without necessitating that he should rectify the experiments of the last occupant and discover what degree of temperature on the dial of the instrument corresponds to the desired temperature.

In the drawings, 1, 1 are the current mains, 2 is a branch circuit leading from the positive main 1, and 3 is a wire leading from 2 to 4 and 5, two associated thermostats presumedly set at high (day) and low (night) temperature.

6 and 7 are the contacts of the thermostats 4 and 5, respectively.

8 represents the door of the state-room and 9 is a switch opening the high temperature circuit when the door is ajar, thus preventing waste of heat and current.

10 is a wire leading from the contact 6 to the switch 9.

11 is a selective switch adapted to make contact with either of the points 12, 13 or 14, and 15 is a wire completing the circuit between the door switch 9 and the switch 11 through the point 12.

16 is a wire connecting the low temperature thermostat 5 to the contact point 13. Thus, as clearly shown, it is possible, by operating the switch 11 over the points 12, 13 and 14, respectively, to turn on high heat, low heat, or no heat, and this is intended to be the extent of the control in the hands of the room occupant.

From the switch 11, a wire 17 leads to another switch or armature 18 adapted to be attracted by an electromagnet 19 into contact with a point 20 when the said magnet is energized by the passage of current in the circuit 21. Current is passed through the wire 21 by closing the switch 22 located, preferably, in the engine or dynamo room, and this current goes through a lamp 23 which, when lighted, serves to indicate clearly and at a distance that the heating current or source of heat is, or may be, used.

24 is an automatic device or combined switch and electromagnet which controls the current or other source of heat flowing to the heater 26. In the case of Fig. 1, this source of heat is the current flowing from the positive main 1 through the wire 25 to the heater 26, thence, through the wire 27, the contacts 28 and wire 29 back to the negative main 1, thus completing the circuit.

The electric regulator 24 is provided with two sets of windings 30 and 31 upon the core of the same. These windings are differential, or in magnetic opposition, and, when current flows through both, no magnetic flux is generated and the armature or core 32 and its terminal 33 fall and close the heater circuit, as clearly shown. It will be understood, of course, that the drawings show the windings 30 and 31 of the regulator 24 diagrammatically and that the same, actually, are not in juxtaposition as shown, but, necessarily, one within the other. The neutralizing windings are inside the direct windings and of smaller sized wire, and, therefore, of greater resistance, in order that the magnetizing force be equal.

In the first room of the series, the regulating current passes from the positive main 1, along the wire 2, through the direct or lift windings 30 of the regulator 24, thence through the wire 34 to the point of junction of the wires 2 and 3 in the next room, and so on through all the rooms, until after passing through the regulator 24 of the last room, the regulating current passes along the wire 35 back to the negative main 1, thus completing the circuit. In each room there is also a derived or shunt circuit 36 which connects the contact point 20 to the neutralizing windings 31 and thus connects the regulating circuit 34 to the branch circuit 3 attached to the common base of the thermostats.

Assuming now that the switch 22 in the engine room is turned on, sending the current through the wire 21, the magnet 19 is energized and the armature 18 is attracted so that it makes contact with the point 20, and the path of the regulating current is as follows: From the positive main 1 it flows along the wires 2 and 3 through the higher temperature thermostat 4, assuming, of course, that the latter is in the circuit, thence through the contact 6, the wire 10, the switch 9, the wire 15, through the switch 11, the wire 17 and the armature 18, along the wire 36, and finally through the windings 31, which, as previously explained, neutralize the magnetizing force of the windings 30, and cause the core or armature 32 to drop and close the heater-circuit. After passing through the windings 31 the regulating current flows along the wire or conduit 34 into the next room, and so on. In the meantime, the heater 26 is supplied with current directly from the positive main 1.

The operation is exactly the same, when the low temperature thermostat is in circuit, except that the current passes from the wire 3 through the thermostat 5 and the contact 7, along the wire 16 and through the switch 11, the latter having, of course, been previously moved into contact with the point 13.

When the circuit is closed by either thermostat and the switches and other devices are in operative position, the windings of the regulator 24 are, of course, in parallel and, therefore, present less resistance than a direct coil alone, and the apparatus is easily designed so that the maximum rise in the regulating circuit may be as low as ten per cent. Therefore, assuming that a lamp as at 39 is required anywhere along the circuit and must burn day and night, it is possible to introduce the same in the regulating circuit making the cost of regulation practically nothing as the current would flow through the lamp anyway. If the lamp is of half the line voltage the fluctuation of the current will be limited to five per cent. and the number of rooms in the series may, of course, be reduced to half the usual number which, as stated hereinbefore, is preferably ten.

If a steam or hot water heater is substituted for the electric heater of Fig. 1, the valve shown in Fig. 3 is attached to the automatic regulator 24, and its armature or core 37 attached to the valve disk 38 performs the function of the valve stem. Otherwise, the arrangement of wires, thermostats, switches and other devices is exactly the same as in Fig. 1, and the valve is closed by the lifting action of the direct windings 30 when the source of heat is to be cut off by the thermostats or by opening the switch 22 in the engine room.

It will be observed that, to all intents and purposes, the electromotive force across the thermostat contacts is equal to that across the lifting or direct windings of the regulator 24, usually and preferably 11 volts, which, of course, is a practicable voltage. Further-more, the direct windings 30 are provided with an inductive resistance 40 in parallel to take up the kick on the break of the circuit. This arrangement of neutralizing winding on the regulator 24 and in the thermostat circuit and as a shunt to the direct regulating current, therefore, of a low potential, makes electro-thermostatic control from high pressure mains practical and durable.

While I have shown the regulator 24 arranged so as to directly close the circuit of an electric heater or operate the valve of a steam or hot water heater, I do not wish to be limited to this arrangement, as there are a number of ways other than these to employ said device. For instance, it may be arranged on the circuit of an electric motor which, in turn, may be arranged to operate dampers or valves of furnaces, or valves of heaters or other apparatus, or the regulator and double thermostat may be employed to regulate the temperature of electrically heated tools, instead of rooms or apartments, as will be readily understood by those skilled in the art.

What I claim as my invention and desire to secure by Letters Patent is:

1. In a temperature control system, the combination with a heater, of an electric regulator having differential windings, one winding being included in a normally closed circuit, and the other being included in a normally open shunt, said shunt having automatic means for closing the same, to energize both windings and connect said heater with a source of heat.

2. In a temperature control system, in combination, a heater, a source of heat supply therefor, an electric regulator having opposed windings, one of said windings, when energized, operating to cut off the source of heat supply, and thermostatic means in the circuit of the other winding for automatically closing the same to energize both windings and connect the supply to the heater.

3. In a temperature control system, in combination, a heater, a regulating circuit, an electric regulator having one set of windings in said circuit and another set of windings in a shunt circuit controllable from a central point, a temperature controlling device in said shunt circuit adapted to open or close the same, whereby said regulator is operated to supply heat to said heater when said shunt circuit is closed.

4. In a temperature control system, in combination, a heater, a source of heat supply therefor, a regulating circuit, an electric regulator having one set of windings in said circuit and another set of windings in a divided shunt circuit, a thermostat in each branch of said shunt, said thermostats being adjusted to close their respective branches at different temperatures and means to place the shunt under the control of any desired thermostat, whereby said regulator is operated to supply heat to said heater when the controlling thermostat closes said shunt.

5. A system of temperature control comprising a series of regulators electrically operated by the same regulating current, the latter being obtained directly from the usual mains, and heaters supplied separately from an independent source of heat but controlled by the said regulators.

6. A system of temperature control comprising a series of regulators provided each with a direct lift winding in a regulating circuit and a neutralizing winding in shunt thereof, a heater under the control of each regulator and supplied from an independent source of heat, and a temperature controlling device in each shunt circuit operating each heater through the agency of its associated regulator.

7. A system of temperature control comprising a series of heaters adapted to be directly connected to the same source of heat, automatic regulators provided with direct lifting and neutralizing windings in magnetizing opposition, said lifting windings being in a regulating circuit obtained directly from the usual current mains, and said neutralizing windings being each in separate shunt circuits controlled by a thermostatic device, the simultaneous passage of current in both said windings releasing the armature of said automatic regulators and thereby operating upon the source of heat.

8. A system of temperature control comprising a series of heaters adapted to be connected to a common source of heat, automatic regulators provided with direct and neutralizing windings, said direct windings being in a regulating circuit common to all the regulators and said neutralizing windings being each in a separate shunt circuit, and thermostats in said shunt circuits adapted to close the same when subjected to a predetermined temperature thereby operating upon the source of heat.

9. A system of temperature control comprising a plurality of heaters adapted to be connected to a common source of heat, a plurality of automatic regulators for said heaters, each provided with direct and neutralizing windings, said direct windings being in a regulating circuit common to all the regulators and said neutralizing windings being each in a separate shunt circuit, a plurality of differently adjusted thermostats arranged in parallel in each shunt and adapted to close the same when subjected to a predetermined temperature, and means for placing said shunts and neutralizing windings under the control of any desired thermostat to cause the corresponding regulator to connect its associated heater to the source of heat.

10. A system of temperature control comprising a plurality of heaters adapted to be connected to a common source of heat, a plurality of automatic regulators for said heaters, each provided with direct and neutralizing windings, said direct windings being in a regulating circuit common to all the regulators and controllable from a central point, and said neutralizing windings being each in a separate shunt circuit, a plurality of differently adjusted thermostats arranged in parallel in each shunt and adapted to close the same when subjected to a predetermined temperature, and means for placing said shunts and neutralizing windings under the control of any desired thermostat to cause the corresponding regulator to connect its associated heater to the source of heat.

11. In a temperature control system, a heater adapted to be directly connected to a source of heat but normally cut off by an automatic electric regulator, said regulator being provided with direct lift windings and neutralizing windings, said direct lift windings being in a regulating circuit which is operatively connected with said source of heat and acts on the armature of said regulator to cut off the heat as stated, and means attached to said armature for turning on the heat when current is passed through said neutralizing windings.

12. In a system of temperature control, a heater adapted to be directly connected to a source of heat but normally cut off by an automatic electric regulator, said regulator being provided with lifting windings in a regulating circuit which is operatively connected with said source of heat, neutralizing windings on said regulator in a shunt circuit, and a thermostat in said shunt circuit and adapted to close the same when subjected to a predetermined temperature, thereby passing current through the said neutralizing windings and turning on the heat automatically.

In testimony whereof, I have signed my name to this specification in the presence of two subscribing witnesses, this 24th day of June, 1907.

HARRY G. GEISSINGER.

Witnesses:
EDITH J. FULLER,
L. HERMANN.